United States Patent [19]

Inoue et al.

[11] Patent Number: 4,695,603
[45] Date of Patent: Sep. 22, 1987

[54] ROOM TEMPERATURE CURABLE SILICONE RUBBER COMPOSITION

[75] Inventors: Yoshio Inoue; Masatoshi Arai; Takeo Inoue, all of Gunma, Japan

[73] Assignee: Shin-Etsu Chemical Co., Ltd., Tokyo, Japan

[21] Appl. No.: 739,421

[22] Filed: May 30, 1985

[30] Foreign Application Priority Data

Jun. 1, 1984 [JP] Japan ................... 59-112752

[51] Int. Cl.$^4$ ................................ C08L 83/08
[52] U.S. Cl. ................... 524/723; 524/728; 524/863; 524/864; 524/720
[58] Field of Search .......... 524/864, 720, 723, 728, 524/863

[56] References Cited

U.S. PATENT DOCUMENTS 4,460,740  7/1984  Arai ........................ 528/33

FOREIGN PATENT DOCUMENTS 56-93755    7/1981  Japan ................... 524/864
56-167754  12/1981  Japan ................... 524/864

Primary Examiner—C. Warren Ivy
Attorney, Agent, or Firm—Jules E. Goldberg

[57] ABSTRACT

The room temperature curable silicone rubber composition of the invention is outstandingly free from the problem of surface stain when a cured elastomer thereof used, for example, in building works is prolongedly exposed to the atmosphere with very durable stain-preventing effect by the formulation of a surface active agent having at least one fluorine atom in a molecule and a specific organosilicon compound of the formula

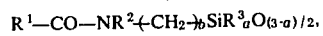

in which $R^1$ and $R^2$ are each a hydrogen atom or a monovalent hydrocarbon group, $R^3$ is a hydrogen atom, or monovalent hydrocarbon group, a is 0–3 and b is a positive integer not larger than 10, in addition to the usual components of conventional room temperature curable silicone rubber compositions.

3 Claims, No Drawings

ROOM TEMPERATURE CURABLE SILICONE RUBBER COMPOSITION

BACKGROUND OF THE INVENTION

The present invention relates to a room temperature curable silicone rubber composition or, more particularly, to a room temperature curable silicone rubber composition useful as a sealing material in building works without the disadvantage of causing stain thereon and therearound.

As is well known, various types of room temperature curable silicone rubber compositions, i.e. liquid or pasty compositions curable at room temperature into a rubbery elastomer, are manufactured and widely used in a variety of application fields. The cured rubbery elastomers obtained from the room temperature curable silicone rubber composition (referred to as RTV hereinbelow) are widely used by virtue of their excellent properties such as weathering resistance, durability, heat and cold resistance and the like. In particular, RTV compositions are widely used in building works as a sealing material or an adhesive between glass-made parts, between glass and a metal, concrete joints and others. More particularly, RTV compositions capable of giving a cured elastomer having a low elastic modulus and large elongation are used as a sealing material of joints where a relatively large relative displacement of the building members is expected. RTV compositions of this type are called a silicone sealant and demand thereof is rapidly increasing year by year.

One of the serious problems in these silicone sealants is the susceptibility of the cured elastomer thereof to surface stain which is presumably due to the remarkable susceptibility of the organopolysiloxane as the principal ingredient of RTV compositions to accumulation of static electricity to attract floating dusts in the atmosphere. Therefore, the aesthetic appearance of buildings constructed using a silicone RTV is lost within a relatively short period due to the stain on the cured elastomer of the silicone sealant. Moreover, deposition of stain is sometimes not limited to the surface of the cured RTV but the stain may propagate or spread over the surfaces of the members adjacent to the sealed joint. This problem is most serious when the members adjacent to the sealed joint are made of a natural stone such as granite and marble.

With an object to solve this problem, an improved RTV composition has been recently proposed by compounding a silicone RTV with a surface active agent having polyoxyethylene groups, sorbitan residues or disaccharide residues in the molecular structure (see, for example, Japanese Patent Kokai No. 56-76452). The desired effect of stain prevention, however, in this type of silicone RTV compositions can be obtained only when the amount of the surface active agent formulated therein is considerably large so that a disadvantage is sometimes unavoidable that the adhesive strength between the sealant and the substrate surface, which is an important property for a sealant, is greatly decreased.

For providing a further improvement of the above mentioned silicone RTV compositions admixed with a surface active agent, it has been proposed to formulate a silicone RTV with a surface active agent having at least one fluorine atom in a molecule (see Japanese Patent Kokai No. 58-167647). According to this further improvement, the amount of the surface active agent can be greatly reduced so that the above mentioned drawback of the decrease in the adhesive strength can be mitigated though with another problem that the durability of the stainpreventing effect is not always satisfactory.

SUMMARY OF THE INVENTION

An object of the present invention therefore is to provide a novel and improved silicone RTV composition which is durably free from the problem of surface stain when used as a sealant without suffering a disadvantageous decrease in the adhesive strength between the cured elastomer thereof and the members adjacent to the joint sealed with the RTV.

The room temperature curable silicone rubber composition of the invention comprises:

(a) 100 parts by weight of a diorganopolysiloxane terminated at both molecular chain ends each with a silanolic hydroxy group bonded to the terminal silicon atom;

(b) from 0.1 to 25 parts by weight of an organosilicon compound having at least two hydrolyzable groups bonded to the silicon atom or atoms in a molecule;

(c) from 0.01 to 5.0 parts by weight of a surface active agent having at least one fluorine atom in a molecule;

(d) from 0.01 to 10 parts by weight of an organosilicon compound having, in a molecule, at least one organosilicon unit represented by the general formula

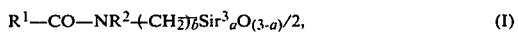

$$R^1—CO—NR^2—(CH_2)_b SiR^3{}_a O_{(3-a)/2}, \quad (I)$$

in which $R^1$ and $R^2$ are each a hydrogen atom or a substituted or unsubstituted monovalent hydrocarbon group having from 1 to 8 carbon atoms independently from the other, $R^3$ is a group or atom selected from the class consisting of substituted or unsubstituted monovalent hydrocarbon groups having from 1 to 8 carbon atoms, alkoxy groups, hydroxy group and hydrogen atom, a is zero, 1, 2 or 3 and b is a positive integer not larger than 10;

(e) from 1 to 400 parts by weight of a filler; and (f) up to 5 parts by weight of a curing catalyst.

In the above formulation, the most characteristic component is the component (d) which is preferably an organosilicon compound represented by the general formula

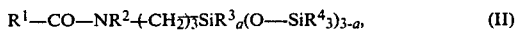

$$R^1—CO—NR^2—(CH_2)_b SiR^3{}_a(O—SiR^4{}_3)_{3-a}, \quad (II)$$

in which $R^1$, $R^2$, $R^3$ and a each have the same meaning as defined above and $R^4$ is a group or atom selected from the same class as for $R^3$.

DETAILED DESCRIPTION OF THE PREFERRED EMBODIMENTS

As is understood from the above description, the present invention provides an improvement of the silicone RTV composition formulated with a fluorine-containing surface active agent to remedy the defects threof by formulating the component (d) as the most characteristic ingredient.

The component (a), i.e. a diorganopolysiloxane having a substantially linear molecular configuration and terminated at both molecular chain ends each with a silanolic hydroxy group, is a well known compound widely used as the principal ingredient in many types of silicone RTV compositions. A diorganopolysiloxane has a molecular structure which is a repetition of a diorganosiloxane unit of the formula $—SiR^2{}_2—O—$, in which R is an organic group and, though not particularly limitative, selected from the class consisting of alkyl groups, e.g. methyl, ethyl, propyl and butyl groups, cycloalkyl groups, e.g. cyclopentyl and cyclohexyl groups, alkenyl groups, e.g. vinyl and allyl groups, aryl groups, e.g. phenyl, tolyl and naphthyl groups, aralkyl groups, e.g. 2-phenylethyl group, and alkoxy groups, e.g. methoxy, ethoxy and propoxy groups, as well as those substituted groups obtained by the replacement of a part or all of the hydrogen atoms in the above named hydrocarbon groups with substituents such as halogen, e.g. chlorine, atoms and amino groups.

The diorganopolysiloxane as the component (a) should have such an average degree of polymerization as to give a viscosity in the range from 100 to 1,000,000 centistokes or, preferably, from 1000 to 50,000 centistokes at 25° C. When the average degree of polymerization of the diorganopolysiloxane is too small, the cured silicone rubber of the RTV composition formulated with such a diorganopolysiloxane would have poor mechanical strengths while an RTV composition formulated with a diorganopolysiloxane having an excessively high average degree of polymerization has poor workability not suitable for the practical application of the composition.

The component (b), which is an organosilicon compound having at least two hydrolyzable groups in a molecule bonded to the silicon atom or atoms, is also a well known compound frequently used in the formulation of RTU compositions to serve as a crosslinking agent. The hydrolyzable group here implied is exemplified by acyloxy groups, e.g. acetoxy, octanoyloxy and benzoyloxy groups, ketoxime groups, e.g. dimethylketoxime, methylethylketoxime and diethylketoxime groups, alkoxy groups, e.g. methoxy, ethoxy and propoxy groups, alkenyloxy groups, e.g. isopropenyloxy and 1-ethyl-2-methylvinyloxy groups, substituted amino groups, e.g. dimethylamino, diethylamino, butylamino and cyclohexylamino groups, substituted aminoxy groups, e.g. dimethylaminoxy and diethylaminoxy groups, and amide groups, e.g. N-methyl acetamide, N-ethyl acetamide and N-methyl benzamide groups.

The organosilicon compound as the component (b) is not particularly limitative in respect of the molecular structure provided that at least two hydrolyzable groups as mentioned above are bonded to the silicon atom or atoms in a molecule optionally in combination with other types of non-hydrolyzable groups. The organosilicon compound may be an organosilane compound or an organopolysiloxane compound which may have a straightly linear, branched or cyclic molecular structure. The above mentioned non-hydrolyzable group is exemplified by alkyl groups, e.g. methyl, ethyl, propyl and butyl groups, cycloalkyl groups, e.g. cyclopentyl and cyclohexyl groups, alkenyl groups, e.g. vinyl and allyl groups, aryl groups, e.g. phenyl, tolyl and naphthyl groups, aralkyl groups, e.g. 2-phenylethyl group, and iminoalkyl groups, e.g. those expressed by the formulas $Me_2C=N-(CH_2)_3$ and $MeEtC=N-(CH_2)_3$, Me and Et denoting methyl and ethyl groups, respectively, as well as those substituted groups obtained by the replacement of a part or all of the hydrogen atoms in the above named groups with substituents such as halogen, e.g. chlorine, atoms.

Particularly preferable examples of the organosilicon compounds usable as the component (b) are those cyclic organopolysiloxanes expressed by the following structural formulas, in which Me, Et and Pr each denote a methyl, an ethyl and a propyl group, respectively:

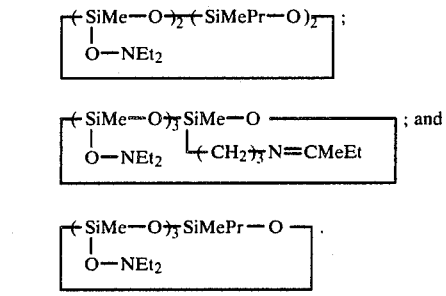

These compounds may be used either singly or as a combination of two kinds or more according to need.

The amount of the component (b) formulated in the inventive composition should be in the range from 0.1 to 25 parts by weight per 100 parts by weight of the component (a). When the amount of the component (b), i.e. crosslinking agent, is too small, no curing of the composition can be obtained as a matter of course. When the amount thereof is too large, on the other hand, shrinkage of the composition by curing is unduly large and the cured elastomer may have poor rubbery elasticity.

The component (c) is a surface active agent having at least one fluorine atom in a molecule and serves to prevent deposition of dusts and dirts on the surface of the cured elastomer of the composition. The polarity of the surface active agent is not particularly limitative including anionic, cationic, non-ionic and amphoteric ones. Particular examples of the fluorine-containing amphoteric surface active agent are those expressed by the following structural formulas, in which $(F)_n$ is a perfluoroalkyl group of the formula $C_nF_{2n+1}$-, n being a positive integer, R is a monovalent organic group, A is an alkyl group or a hydroxyalkyl group and p, q and r are each a positive integer:

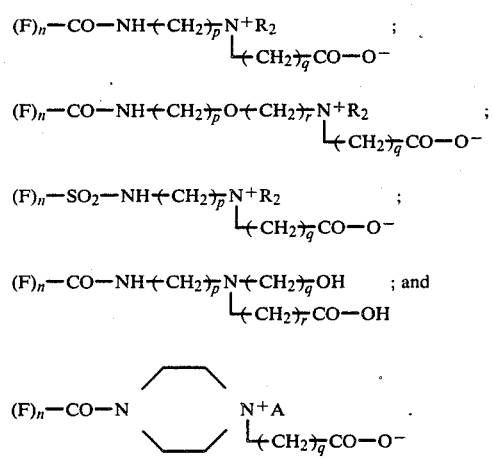

The fluorine-containing anionic surface active agents are typically represented by the general formula $(F)_n$—$SO_3M$ or $(F)_n$—$COOM$, in which $(F)_n$ has the meaning as defined above and M is a hydrogen atom or an atom of alkali metal while the fluorine-containing cationic surface active agents are typically represented by the general formula $(F)_n$—$SO_2$—NH—$(CH_2)_p$—$N^+R_3.X^-$ or $(F)_n$—CO—NH—$(CH_2)_p$—$N^+R_3.X^-$, in which $(F)_n$, R and p each have the same meaning as defined above and X is a halogen atom. Further the fluorine-containing non-ionic surface active agents are typically represented by the general formula $(F)_n$—$SO_2$—N-R—$(CH_2CH_2$—$O)_s$H, in which $(F)_n$ and R each have the same meaning as defined above and s is a positive integer. Among those above named surface active agents, the amphoteric ones represented by the first-given general formula are particularly preferable to the others. It is preferable that the fluorine-containing surface active agent as the component (c) should have such a surface activity that a 0.01% by weight aqueous solution thereof has a surface tension of 60 dyn/cm or smaller at 20° C.

The amount of the component (c) should be in the range from 0.01 to 5.0 parts by weight or, preferably, from 0.1 to 2.0 parts by weight per 100 parts by weight of the component (a). When the amount of the component (c) is smaller than the above range, no satisfactory effect of stain prevention can be obtained on the surface of the cured elastomer of the RTV composition. When the amount of the component (c) is too large in the RTV composition, on the other hand, the adhesive strength of the cured elastomer to the substrate surface may be decreased along with decrease in the hardness and mechanical strengths of the cured elastomer.

The organosilicon compound as the component (d), which is the most characteristic ingredient in the inventive composition, has at least one organosilicon unit represented by the above given general formula (I), of which the meaning of each symbol has been defined already. In particular, $R^1$ and $R^2$ are each a hydrogen atom or a monovalent hydrocarbon group having 1 to 8 carbon atoms exemplified by alkyl groups, e.g. methyl, ethyl and propyl groups, alkenyl groups, e.g. vinyl and allyl groups, aryl groups, e.g. phenyl and tolyl groups, and cycloalkyl groups, e.g. cyclohexyl group, as well as those substituted groups obtained by the replacement of a part or all of the hydrogen atoms in the above named hyorocarbon groups with substituents such as halogen atoms and cyano groups. $R^3$ may be a hydrogen atom, a monovalent hydrocarbon group having 1 to 8 carbon atoms as exemplified by the same examples as for $R^1$ and $R^2$ or an alkoxy group, e.g. methoxy, ethoxy and propoxy groups, or a hydroxy group.

A particularly preferable class of the organosilicon compound represented by the general formula (I) includes those represented by the general formula (II), of which the definition of each symbol has already been given. Several of the examples of such organosilicon compounds are those expressed by the following structural formulas, in which Me, Et, Ph and Vi denote methyl, ethyl, phenyl and vinyl groups, respectively:

Ph—CO—NMe—$(CH_2)_3$Si(—O—SiPhMe$_2$)$_3$;

Me—CO—NH—$(CH_2)_3$Si(—O—SiPh$_2$Me)$_3$;

Ph—$CH_2$—CO—NMe—$(CH_2)_3$Si(—O—SiViMe$_2$)$_3$;

Ph—CO—NMe—$(CH_2)_3$Si(—O—SiVi$_3$)$_3$;

Me—CO—NMe—$(CH_2)_3$Si(—O—SiCH$_2$CH$_2$CF$_3$.Me$_2$)$_3$;

H—CO—NMe—$(CH_2)_3$Si(—O—SiMe$_3$)$_3$;

H—CO—NH—$(CH_2)_3$Si(—O—SiMe$_3$)$_3$;

Me$_3$Si—O—$(SiMe$—$O)_4$—$(SiMe_2$—$O)_{20}$—SiMe$_3$;
　　　└$(CH_2)_3$NMe—CO—Me

[—$(SiMe$—$O)_2$—$(SiMe_2$—$O)_7$—]
　└$(CH_2)_3$NEt—CO—Ph

Me—CO—NMe—$(CH_2)_3$Si(—OMe)$_3$;

Me—CO—NMe—$(CH_2)_3$Si(OEt)(—O—SiMe$_3$)$_2$; and

Me—CO—NMe—$(CH_2)_3$SiMe$_2$—OH.

The first step in a general method for the preparation of these orgaosilicon compounds is the desalting condensation reaction between a 3-chloropropyl-containing organosilicon compound and a sodium amide derivative of the formula Na.NR$^2$—CO—R$^1$, in which R$^1$ and R$^2$ each have the meaning as defined above, in a polar organic solvent.

The amount of the component (d) in the inventive RTV composition should be in the range from 0.01 to 10 parts by weight or, preferably, from 0.1 to 5 parts by weight per 100 parts by weight of the component (a). When the amount thereof is smaller than the above range, no satisfactory improvement can be obtained in the durability of the stain preventing effect on the cured elastomer of the composition. When the amount thereof is excessively large, on the other hand, the curability of the composition may be poor in addition to the disadvantage of somewhat inferior mechanical properties of the cured elastomer.

The filler as the component (e) in the inventive composition may be any of conventional ones used in the formulation of RTV silicone, compositions including, for example, fumed silica, which may be optionally treated on the surface with hexamethyl disilazane, a cyclic dimethylpolysiloxane and the like known surface-treatment agent, precipiated silica, quartz powder, diatomaceous earth, titanium dioxide, aluminum oxide, lead oxide, iron oxide, carbon black, bentonite, graphite powder, calcium carbonate, mica flakes, clay, glass beads, glass microballoons, glass fibers and beads of certain synthetic resins, e.g. polyvinyl chloride, polystyrene, acrylic resins and the like. The amount of the component (e) should be in the range from 1 to 400 parts by weight or, preferably, from 50 to 150 parts by weight per 100 parts by weight of the component (a). When the amount of the component (e) is too small in the RTV composition, the cured elastomer thereof may have no sufficient mechanical properties. When the amount of the component (e) is too large, on the other hand, the cured product of the RTV composition would have poor rubbery elasticity.

The component (f), which is a curing catalyst optionally formulated in the inventive RTV composition, is selected from those known compounds used as a curing catalyst in similar silicone RTV compositions including, for example, metal salts of carboxylic acids, e.g. lead 2-ethylhexoate, dibutyltin dioctoate, dibutyltin diacetate, dibutyltin dilaurate, butyltin 2-ethylhexoate, iron 2-ethylhexoate, cobalt 2-ethylhexoate, manganese 2-ethylhexoate, zino 2-ethylhexoate, tin (II) caprylate, tin butyrate, titanium naphthenate, zinc naphthenate, cobalt naphthenate and zinc stearate, organic titanate esters, e.g. tetrabutyl titanate, tetra(2-ehylhexyl) titanate, triethanolamine titanate and tetra(isopropenyloxy) titanate, organotitanium compounds, e.g. β-carbonyl titanium, aluminum alkoxide compounds, aminoalkyl-substituted alkoxysilanes, e.g. 3-aminopropyl triethoxysilane and N-(trimethylsilylpropyl) ethylenediamine, amine compounds and salts thereof, e.g. hexylamine and dodecylamine phosphate, quaternary ammonium salts, e.g. benzyl triethyl ammonium acetate, alkali metal salts of lower carboxylic acids, e.g. potassium acetate, sodium acetate and lithium oxalate dialkylhydroxylamines, e.g. dimethyl hydroxylamine and diethyl hydroxylamine and guanidine compounds and 2-guanidino-containing organosilane and organopolysiloxane compounds expressed, for example, by the formulas 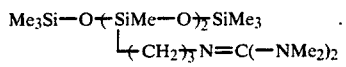 and

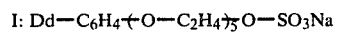

These compounds may be used either singly or as a combination of two kinds or more according to need.

The curing catalyst of the component (f) is an optional ingredient in the inventive RTV composition and may not be used depending particularly on the type of the hydrolyzable groups in the component (b). It is, however, preferable in most cases to add at least a small amount of the component (f) in the RTV composition since the RTV composition admixed with no or too little amount of the curing catalyst may take an unduly long time for complete curing or hardly no curing can be obtained in the depth of a thick layer of the composition. When the amount of the component (f) is too large, the curing reaction proceeds too rapidly in the RTV composition to cause some troubles in relation to workability thereof and the cured elastomer of the RTV composition has poor heat resistance and weathering resistance. Accordingly, the preferable range of the amount of the component (f) in the inventive RTV composition is in the range from 0.01 to 5 parts by weight or, more preferably, from 0.1 to 3 parts by weight per 100 parts by weight of the component (a).

The silicone RTV composition of the invention can be prepared by merely blending the above describe components (a) to (e) and, optionally, (f) uniformly in a suitable mixing procedure. It is a convenient way that first the components (a), (b), (e) and, optionally, (f) are mixed together uniformly and the components (c) and (d) are admixed thereto subsequently. The thus prepared composition is usually packed and stored in a hermetically sealable container, such as a tube, from which the composition is dispensed by squeezing when it is used. Alternatively, the composition is supplied in two packages each containing different component or components from the other and the contents of these two packages are mixed together directly before use.

It is optional that the inventive RTV composition may be further admixed according to need with various kinds of known additives including plasticizers, coloring agents, e.g. pigments, flame retardant agents, thixotropy improvers, antibacterial and fungicidal agents, adhesion improvers such as the so-called carbon-functional silane compounds having amino, epoxy, mercapto and the like functional groups, and so on although the amounts thereof are rather limited not to decrease the desired effects of the inventive composition.

In the following, the inventive silicone RTV composition of the invention is described in more detail by way of Examples and Comparative Examples, in which the expression of "parts" always refers to "parts by weight" and the values of viscosity are all those obtained by the measurements at 25° C.

Comparative Example 1 (Compositions No. 1 to No. 6) and Example 1 (Compositions No. 7 to No. 15)

A base compound was prepared by uniformly blending 100 parts of a dimethylpolysiloxane having a viscosity of 20,000 centistokes and terminated at both molecular chain ends each with a silanolic hydroxy group and 10 parts of a fumed silica filler and the base compound was further admixed with 0.2 part of dibutyltin dioctoate, 5 parts of methyl tris(butanoneoxime)silane and one of the surface active agents I to IV and one of the organosilicon compounds I to III indicated below, denoting methyl, ethyl, perfluoropropyl, dodecyl and phenyl groups with the symbols of Me, Et, (F)$_3$, Dd and Ph, respectively, each in an amount shown in Table 1. Each of the thus prepared RTV compositions was stored in a hermetically sealable container.

Surface active agents

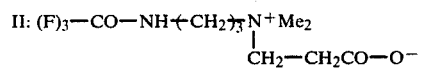

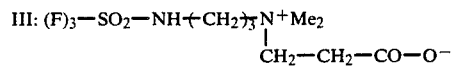

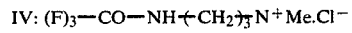

Organosilicon compounds
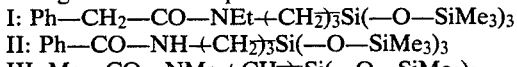

Thereafter, two granite slabs each having dimensions of 300 mm by 300 mm by 15 mm were placed apart on a horizontal plane side by side with a gap of 15 mm width therebetween followed by filling of the gap with one of the above prepared compositions No. 1 to No. 15 and kept standing outdoors for 6, 12 or 18 months to examine and evaluate the condition of stain on the surface of the cured composition as well as on the surface of the granite slabs adjacent to the cured composition in 5 ratings of A (as clean as before test), B (no clearly distinguishable stain), C (very little stain), D (apparently distinguishable stain) and E (remarkable stai ). The results are shown in Table 1.

TABLE 1

| Composition No. | Surface active agent (parts) | Organo-silicon compound (parts) | Condition of stain after 6 months | 12 months | 18 months |
| --- | --- | --- | --- | --- | --- |
| 1 | I (1.0) | None | D | E | E |
| 2 | I (5.0) | None | D | E | E |
| 3 | I (10.0) | None | C | D | E |
| 4 | II (0.1) | None | A | C | D |
| 5 | II (0.5) | None | A | C | D |
| 6 | II (1.0) | None | A | B | D |
| 7 | III (0.1) | I (0.5) | A | B | C |
| 8 | III (0.5) | I (0.5) | A | A | A |
| 9 | III (1.0) | I (0.5) | A | A | A |
| 10 | IV (0.5) | II (0.1) | A | B | C |
| 11 | IV (0.5) | II (0.5) | A | A | A |

TABLE 1-continued

| Composition No. | Surface active agent (parts) | Organo-silicon compound (parts) | Condition of stain after 6 months | 12 months | 18 months |
|---|---|---|---|---|---|
| 12 | IV (0.5) | II (1.0) | A | A | A |
| 13 | II (0.1) | III (0.5) | A | B | C |
| 14 | II (0.5) | III (0.5) | A | A | A |
| 15 | II (1.0) | III (0.5) | A | A | A |

Comparative Example 2 (Compositions No. 16 to No. 21) and Example 2 (Compositions No. 22 to No. 30)

A base compound was prepared by uniformly blending 60 parts of a dimethylpolysiloxane having a viscosity of 5000 centistokes and terminated at both molecular chain ends each with a silanolic hydroxy group and 40 parts of a calcium carbonate filler and 100 parts of the base compound were further admixed with one of the surface active agents I, II, III and V (see the formula given below) and one of the organosilicon compounds I to III each in an amount indicated in Table 2 below and 25 parts of a 95:5 by weight mixture of cyclic organopolysiloxanes expressed by the formulas

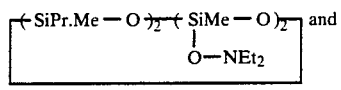

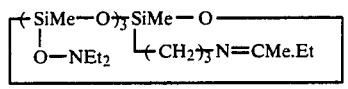

Surface active agent
V: $(F)_3$—$SO_2$—$NMe(CH_2+CH_2$—$O)_2H$

Each of the thus prepared compositions was used for filling a gap of two granite slabs in just the same manner as in Example 1 and the condition of surface stain on the cured composition and granite slabs was examined after 6, 12 or 18 months of exposure to give the results shown in Table 2.

TABLE 2

| Composition No. | Surface active agent (parts) | Organo-silicon compound (parts) | Condition of stain after 6 months | 12 months | 18 months |
|---|---|---|---|---|---|
| 16 | I (2.0) | None | D | E | E |
| 17 | I (5.0) | None | D | E | E |
| 18 | I (10.0) | None | D | E | E |
| 19 | III (0.2) | None | B | C | D |
| 20 | III (0.5) | None | A | C | D |
| 21 | III (1.0) | None | A | C | D |
| 22 | II (0.2) | I (0.5) | A | B | C |
| 23 | II (0.5) | I (0.5) | A | A | B |
| 24 | II (1.0) | I (0.5) | A | A | A |
| 25 | III (0.2) | II (0.1) | A | B | B |
| 26 | III (0.5) | II (0.5) | A | A | A |
| 27 | III (0.5) | II (1.0) | A | A | A |
| 28 | V (0.2) | III (0.5) | A | B | B |
| 29 | V (0.5) | III (0.5) | A | A | B |
| 30 | V (1.0) | III (0.5) | A | A | B |

Further, several of the above prepared compositions were subjected to the tests of the mechanical properties and the adhesion tests using test speciments prepared according to JIS A 5758 with glass plates as the substrates after curing for 7 days at 20° C. in an atmosphere of 55 % relative humidity The measurements were undertaken with the test specimens as cured in the above conditions or after further dipping in water at 50° C. for 5 days. The results obtained are shown in Table 3 below.

TABLE 3

| Composition No. | 16 | 18 | 20 | 23 | 24 | 26 | 27 | 30 |
|---|---|---|---|---|---|---|---|---|
| As cured: | | | | | | | | |
| 50% modulus, kg/cm² | 1.4 | 1.0 | 1.5 | 1.5 | 1.6 | 1.5 | 1.5 | 1.6 |
| 150% modulus, kg/cm² | 2.2 | 1.6 | 2.3 | 2.3 | 2.4 | 2.4 | 2.3 | 2.3 |
| Tensile strength, kg/cm² | 5.3 | 3.2 | 7.3 | 7.0 | 7.4 | 7.2 | 6.5 | 7.2 |
| Elongation at break, % | 930 | 700 | 1100 | 1050 | 1200 | 1100 | 1000 | 1100 |
| Cohesive failure, % | 100 | 0 | 100 | 100 | 100 | 100 | 100 | 100 |
| After dipping in water: | | | | | | | | |
| 50% modulus, kg/cm² | 1.4 | 1.0 | 1.5 | 1.4 | 1.4 | 1.5 | 1.4 | 1.4 |
| 150% modulus, kg/cm² | 2.1 | 1.5 | 2.1 | 2.3 | 2.3 | 2.4 | 2.4 | 2.3 |
| Tensile strength, kg/cm² | 4.5 | 3.0 | 7.0 | 6.8 | 6.7 | 7.1 | 7.0 | 7.3 |
| Elongation at break, % | 820 | 650 | 1150 | 1140 | 1100 | 1190 | 1140 | 1250 |
| Cohesive failure, % | 0 | 0 | 100 | 100 | 100 | 100 | 100 | 100 |

What is claimed is:

1. A room temperature curable silicone rubber composition which comprises:
   (a) 100 parts by weight of a diorganopolysiloxane having a viscosity ranging from 100 to 1,000,000 centistokes, which is terminated at both molecular chain ends with a silanolic hydroxy group bonded to the terminal silicon atom;
   (b) from 0.01 to 25 parts by weight of an organosilicon compound having at least two hydrolyzable groups bonded to the silicon atoms in a molecule;
   (c) from 0.01 to 5.0 parts by weight of a surface active agent having at least one fluorine atom in a molecule;
   (d) from 0.01 to 10 parts by weight of an organosilicon compound having, in a molecule, at least one organosilicon unit epresented by the general formula

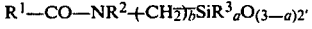

in which $R^1$, $R^2$ and $R^3$ may be the same or different and are elected from the group consisting of monovalent hydrocarbon having from 1 to 8 carbon atoms, monovalent hydrocarbon having 1 to 8 carbon atoms substituted with halogen or cyano and hydrogen, a is zero, 1, 2 or 3 and b is a positive integer not larger than 10; and
   (e) from 1 to 400 parts by weight of a filler.

2. The room temperature curable silicone rubber composition as claimed in claim 1 wherein the component (d) is an organosilicon compound represented by the general formula

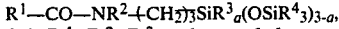

in which $R^1$, $R^2$, $R^3$ and a each have the same meaning as defined above and $R^4$ is a group or atom selected from the same class as for $R^3$.

3. The composition of claim 1 further comprising a curing catalyst in an amount from 0.01 to 5 parts by weight per 100 parts by weight of component (a).

* * * * *